US007762298B2

(12) United States Patent
Miyasaka et al.

(10) Patent No.: US 7,762,298 B2
(45) Date of Patent: Jul. 27, 2010

(54) PNEUMATIC TIRE WITH TREAD HAVING FIRST TYPE OF SIPES AND SECOND TYPE OF SIPES

(75) Inventors: Atsushi Miyasaka, Kodaira (JP); Arata Tomita, Kodaira (JP); Yasuo Osawa, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 1007 days.

(21) Appl. No.: 11/491,095

(22) Filed: Jul. 24, 2006

(65) Prior Publication Data
US 2007/0017618 A1 Jan. 25, 2007

(30) Foreign Application Priority Data
Jul. 22, 2005 (JP) .............................. 2005-213047

(51) Int. Cl.
*B60C 11/12* (2006.01)
(52) U.S. Cl. .............................. 152/209.8; 152/209.15; 152/209.21; 152/209.27; 152/209.28; 152/DIG. 3
(58) Field of Classification Search .............. 152/209.8, 152/209.9, 209.15, 209.18, 209.21, 209.27, 152/209.28, 902, 903, DIG. 3
See application file for complete search history.

(56) References Cited

U.S. PATENT DOCUMENTS

| 5,824,169 | A | * | 10/1998 | Landers et al. | ......... | 152/DIG. 3 |
| 5,837,074 | A | * | 11/1998 | Uemura | ................. | 152/209.18 |
| 6,311,748 | B1 | * | 11/2001 | Boiocchi et al. | ....... | 152/DIG. 3 |
| 6,619,352 | B2 | * | 9/2003 | Diensthuber et al. | ... | 152/DIG. 3 |
| 6,892,775 | B1 | * | 5/2005 | Himuro | ................. | 152/DIG. 3 |
| 2002/0007889 | A1 | * | 1/2002 | Eromaki | ................ | 152/209.17 |
| 2006/0011279 | A1 | * | 1/2006 | Miyasaka | .............. | 152/209.21 |

FOREIGN PATENT DOCUMENTS

| JP | 02-057408 | * | 2/1990 |
| JP | 03-262170 | * | 11/1991 |
| JP | 05-301508 | * | 11/1993 |

(Continued)

*Primary Examiner*—Steven D Maki
(74) *Attorney, Agent, or Firm*—Sughrue Mion, PLLC (57) ABSTRACT

A pneumatic tire has a tread pattern wherein a circumferential groove continuously extending in a circumferential direction is formed in at least a first half part of a treading face within a range of 10-30% of a treading face width from an end of the treading face and a plurality of curvedly slant grooves extending from the circumferential groove toward a side of a central part of the treading face so as to make an angle at an acute angle side with respect to the circumferential direction gradually small away from the circumferential groove are arranged at intervals in the circumferential direction, in which a land row consisting of tapered land portions defined between the circumferentially adjoining curvedly slant grooves and having a width gradually decreased toward the side of the central part of the treading face is formed in the treading face, and sipes linearly extending at two large and small inclination angles with respect to the circumferential direction without crossing with each other are alternately arranged in the circumferential direction, and first type of the sipes has an angle at the acute angle side with respect to the circumferential direction of 75-90° and second type of the sipes has an angle at the acute angle side of 30-60°.

7 Claims, 6 Drawing Sheets

FOREIGN PATENT DOCUMENTS

| | | | |
|---|---|---|---|
| JP | 10-100618 | * | 4/1998 |
| JP | 10-230712 | * | 9/1998 |
| JP | 2000-108615 | * | 4/2000 |
| JP | 2000-177325 | * | 6/2000 |
| WO | WO 2004/041556 | * | 5/2004 |

* cited by examiner

(b) b-b section

PNEUMATIC TIRE WITH TREAD HAVING FIRST TYPE OF SIPES AND SECOND TYPE OF SIPES

BACKGROUND OF THE INVENTION

1. Field of the Invention

This invention relates to a pneumatic tire advantageously improving the resistance to uneven wear without sacrificing the wet performances, performances on snow and steering stability on dry road surface, particularly tires usable for use in passenger cars and small-size trucks.

2. Description of the Related Art

Figure 6:
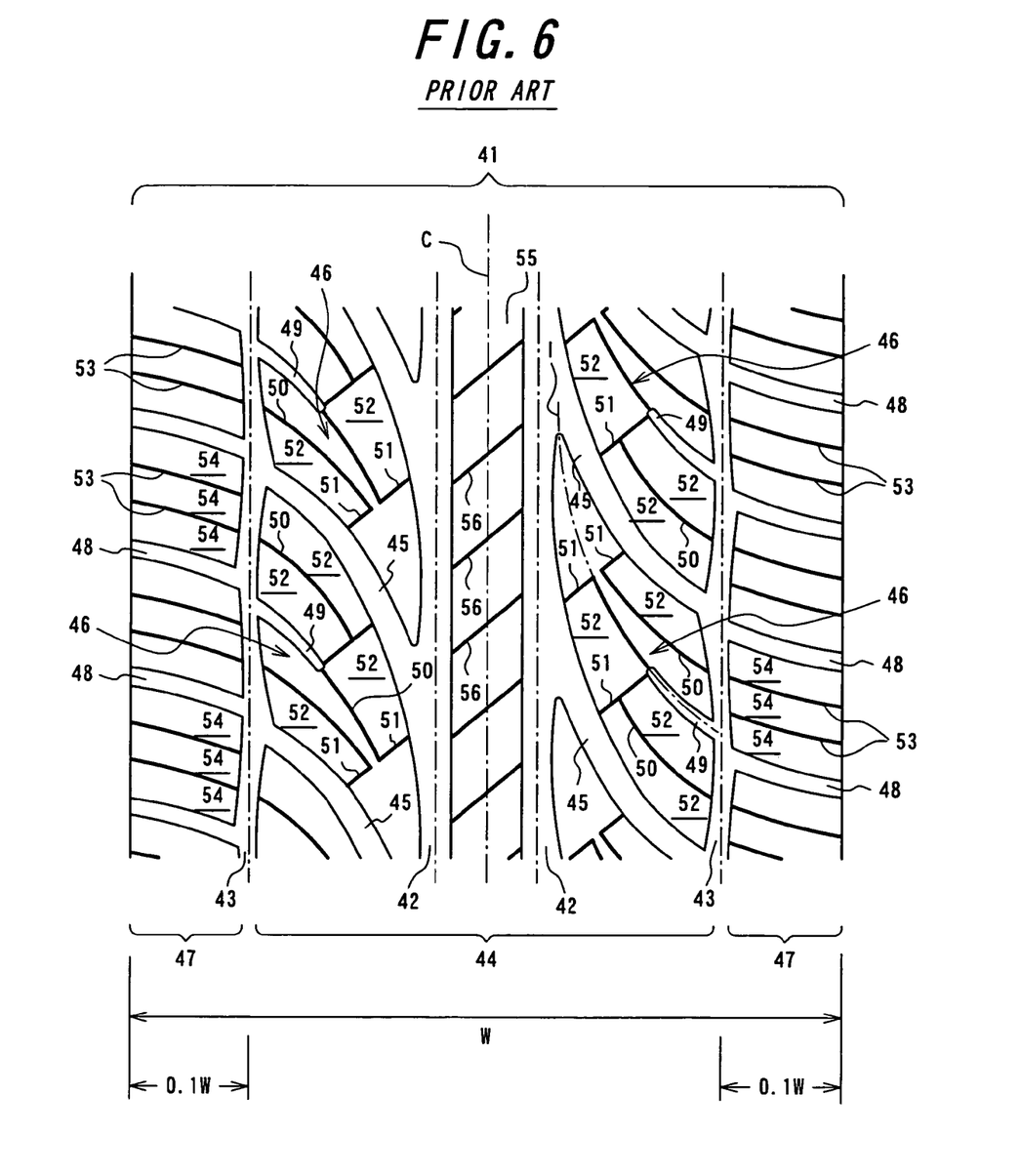
FIG. 6 is a developed view of a tread pattern in the conventional tire.

As this type of the conventional pneumatic tire attaching importance to the wet performances, steering stability and performances on snow, there are tires having a tread pattern as shown by a developed view in FIG. 6.

In this case, a pair of main grooves 42 extending linearly and continuously in a circumferential direction are arranged on a central part of a treading face 41 at a given interval in a widthwise direction of the treading face, and one circumferential groove 43 extending continuously in the circumferential direction is arranged at a position corresponding to 10% of a width W of the treading face from each end of the treading face. In each half part of a central region 44 defined between the circumferential grooves 43 are arranged a plurality of curvedly slant grooves 45 at intervals in the circumferential direction, in which each of the curvedly slant grooves 45 extends from the circumferential groove 43 toward the main groove 42 and open-mouthedly terminates at the main groove 42 and an angle at an acute angle side with respect to the circumferential direction is gradually made small toward the main groove 42, whereby a tapered land portion 46 gradually decreasing a width toward the main groove 42 is defined between the circumferentially adjoining curvedly slant grooves 45. Also, a land row consisting of the tapered land portions 46 is formed in the each half part of the central region in a point-symmetry with respect to a center C of the treading face. Furthermore, transverse grooves 48 each inclining in the same direction as the curvedly slant groove 45 and opening at the circumferential groove 43 and the tread face end and having an angle at the acute angle side with respect to the circumferential direction larger than that of the curvedly slant groove 45 are formed in each side region 47 defined between the circumferential groove 43 and the tread face end at intervals in the circumferential direction, whereby a land in the side region 47 is rendered into a block row. Moreover, the "width" of the tapered land portion 46 means a land portion width measured in a direction perpendicular to a center line 1 of the land portion 46 extending in the extending direction thereof at a developed plan view of the land portion 46.

In each of the tapered land portions 46 is arranged a sub-groove 49 opening at one end to the circumferential groove 43 and terminating at the other end in the land portion 46 so as to extend on the center line 1 of the land portion 46 at a position corresponding to a middle between the mutually adjoining curvedly slant grooves 45, and a plurality of long sipes 50 extending from the sub-groove 49 and extending substantially in parallel along the sub-groove 49 and a plurality of short sipes 51 extending in a direction substantially perpendicular to the curvedly slant groove 45, whereby a plurality of sub-blocks 52 having a curved rectangular form with a long side in the extending direction of the long sipe 50 are formed together with the slant grooves 45 and the circumferential groove 43 in the tapered land portion 46. In each of the blocks in the side region 47 are formed a plurality of sipes 53 extending along the transverse groove 48 at a full width of the block to define sub-blocks 54 having a rectangular form with a long side in the extending direction of the sipe 53. Furthermore, a plurality of slant sipes 56 linearly extending upwards to the right in the drawing and opening to both the main grooves 42 are formed in a rib 55 between the main grooves 42 at even intervals in the circumferential direction.

According to the tire having the above construction, the wet drainage property is ensured by the grooves 42, 43, 45, 48 and 49, and the performances on snow are ensured by the curvedly slant grooves 45, transverse grooves 48 and sub-grooves 49, while edge components of the grooves 45, 48 and 49 and the sipes 50, 51, 53 and 56 extending in the widthwise direction of the treading face can develop a function of cutting water film on a wet road surface and contribute to more improvement of traction and braking performances on snow.

In the above conventional technique, however, there is a problem that since each of the sub-blocks 52 formed in the tapered land portion 46 and the sub-blocks 54 formed in the side block has a long rectangular form in the extending directions of the long sipe 50 and the sipe 53, if a force in a short-side direction is applied to these sub-blocks 52, 54 during the running of the tire under loading, a large fall-down deformation is caused in the sub-block to generate a large uneven wearing in these sub-blocks and hence the tapered land portions 46 and side block.

SUMMARY OF THE INVENTION

It is, therefore, an object of the invention to solve the aforementioned problem in the conventional technique and to provide a pneumatic tire advantageously improving the resistance to uneven wear without sacrificing the wet performances, performances on snow and steering stability on dry road surface.

According to the invention, there is the provision of a pneumatic tire having a tread pattern wherein one or more circumferential grooves continuously extending linearly or zigzag in a circumferential direction are formed in at least a first half part of a treading face within a range of 10-30% of a width of the treading face from an end of the treading face and a plurality of curvedly slant grooves extending from at least one circumferential groove, e.g. from each of the plural circumferential grooves toward a side of a central part of the treading face so as to make an angle at an acute angle side with respect to the circumferential direction gradually small away from the circumferential groove are arranged at intervals in the circumferential direction, in which a land row consisting of tapered land portions defined between the circumferentially adjoining curvedly slant grooves and having a width gradually decreased toward the side of the central part of the treading face is formed in the treading face, and sipes linearly extending at two large and small inclination angles with respect to the circumferential direction without crossing with each other are alternately arranged in the circumferential direction, and first type of the sipes has an angle at the acute angle side with respect to the circumferential direction of 75-90° and second type of the sipes has an angle at the acute angle side of 30-60°, and sub-blocks having a triangular, trapezoidal or pentagonal form viewed from a developed plan view are defined by these sipes and the adjoining curvedly slant grooves in the tapered land portion.

Moreover, the extending position of the circumferential groove is a position of a center line thereof, and the "width" of the tapered land portion means a width of the land portion measured in a direction perpendicular to a center line of the land portion extending in the extending direction of the land portion as previously mentioned, and the extension of the sipes "without crossing with each other" means the form of extending both sipes without crossing inclusive of a case that both the spies are ended at an intersect. Also, the "sipe" means a narrower-width groove contacting opposed groove walls with each other in the ground contact area during the running of the tire under loading.

In a preferable embodiment of the invention, one or more slant sub-grooves linearly extending at an angle at the acute angle side with respect to the circumferential direction of 30-60° in a direction opposite to the curvedly slant groove and communicating the adjoining curvedly slant grooves to each other are formed in each of the tapered land portions. For example, the slant sub-grooves having a groove center line within a range of 35-75% of the treading face width from the end of the treading face are formed at intervals in the circumferential direction. These slant sub-grooves contribute to the formation of a zigzag groove continuously extending in the circumferential direction through the respective curvedly slant grooves.

In this case, it is preferable that the slant sub-groove is extended substantially in parallel to the aforementioned second type of the sipes, i.e. the sipe extending at an angle of 30-60° with respect to the circumferential direction. The wording "substantially in parallel" used herein also includes a case that since the extending angle of the second type of the sipes in the one tapered land portion generally varies within an angle range of ±15°, the angle difference within the above angle range is existent.

In the other tire according to the invention, the aforementioned tread pattern is formed in the first half part of the treading face, while a second circumferential groove linearly extending in the circumferential direction at a position corresponding to 10-25% of the treading face width and a third circumferential groove separated inward from the second circumferential groove in the widthwise direction and linearly extending in the circumferential direction are arranged in a second half part of the treading face, and a width of a land row defined between the third circumferential groove and one main groove extending in the first half part of the treading face is made not less than 1.5 times a width of a land row defined between the second circumferential groove and the third circumferential groove, whereby the tread patterns formed in these half parts of the treading face are asymmetric with respect to the center of the treading face. Moreover, this tire is usually mounted on a vehicle at a posture of facing a wide-width land row to an outside of a vehicle.

In such a tire, it is preferable that a plurality of slant grooves inclining in the same direction as in the curvedly slant groove and opening to the second and third circumferential grooves are arranged between these circumferential grooves at intervals in the circumferential direction to render the land row between the circumferential grooves into a block row.

In this case, it is preferable that each of the slant grooves is opened to the second circumferential groove through a region reducing a cross-sectional area in the vicinity of the second circumferential groove.

Preferably, a sub-groove protruding from the circumferential groove extended in the first half part of the treading face toward a side of the treading face end and terminating in the land part is formed on an extension of the curvedly slant groove.

More preferably, another sub-groove protruding from the second circumferential groove toward a side of the end of the treading face and terminating in the land part is formed on an extension of the slant groove.

In the other pneumatic tire according to the invention, the aforementioned tread pattern is formed in the first half part of the treading face, while a land row showing a line symmetry with the above tread pattern is formed in the second half part of the treading face through a center circumferential groove continuously extending at the central portion of the treading face in the circumferential direction.

In the further pneumatic tire according to the invention, the aforementioned tread pattern is formed in the first half part of the treading face, while a land row showing a point symmetry with the above tread pattern is formed in the second half part of the treading face through a center circumferential groove continuously extending at the central portion of the treading face in the circumferential direction.

In these tires, it is more preferable that the land row formed outward in the widthwise direction from the circumferential groove located nearest to the end of the treading face is a rib and one circumferential sipe extending linearly and continuously in the circumferential direction is formed in a widthwise middle portion of the rib, and lateral sipes are formed between the circumferential sipe and the circumferential groove and between the circumferential sipe and the end of the treading face, respectively, so as to extend in the widthwise direction of the treading face and open to the circumferential sipe, circumferential groove and the treading face end, while a pitch of the lateral sipes formed side the circumferential groove is made larger than a pitch of the lateral sipes formed side the treading face end, and further a sub-groove is arranged between the lateral sipes, which are formed between the circumferential sipe and the circumferential groove, for example, at a middle position between the adjoining lateral sipes so as to terminate without arriving at the circumferential sipe and open to the circumferential groove and also a lateral groove opening to the circumferential sipe and the treading face end is formed between the circumferential sipe and the treading face end every one or more lateral sipes at a position corresponding to the forming pitch of the lateral sipe.

In the tire according to the invention, an excellent drainage property in front-back direction of the tire during the running under loading can be realized by arranging one or more circumferential grooves continuously extending in the circumferential direction within a range of 10-30% of the width of the treading face from the treading face end. Moreover, the reason why the forming position of one or more circumferential grooves is limited to the range of 10-30% of the width of the treading face from the treading face end is due to the fact that when the position is less than 10%, the width of the land part defined toward the side of the treading face end under the formation of the circumferential groove having a usual width (e.g. a range of 5-15 mm) and hence the rigidity thereof is lacking to deteriorate the turning performance and also the wearing volume of the land part formed toward the side of the treading face end is lacking to easily cause the premature wear as compared with the other part, while when it exceeds 30%, the drainage property of the land part formed toward the treading face end lowers.

Furthermore, a plurality of curvedly slant grooves extending from the circumferential groove toward a side of the central portion of the treading face so as to make an angle at an acute angle side with respect to the circumferential direction gradually small away from the circumferential groove are arranged in the half part of the treading face, whereby the drainage can be conducted more smoothly and rapidly and the performances on snow can be ensured, and also a high rigidity to a large lateral force particularly input from the side of the treading face end in the widthwise direction of the tread can be developed in a part of the land portion defined between the curvedly slant grooves near to the treading face end to effectively prevent the occurrence of uneven wear or the like in the part near to the treading face end.

In addition, the sipes extending at two large and small angles without crossing to each other are alternately arranged in the circumferential direction on the each tapered land portion defined between the curvedly slant grooves and having a width decreasing toward the central side of the treading face to define a plurality of sub-blocks, and since the sipes themselves are narrower-width grooves each contacting its opposed groove walls with each other in the ground contact area, these sub-blocks are born with each other under the contact in the ground contact area, so that the rigidity of the each tapered land portion and hence the whole of the land row consisting of these portions can be sufficiently ensured to sufficiently remove the fear such as occurrence of uneven wear due to the lacking of the rigidity, deterioration of steering stability or the like.

In this tire, two types of the sipes extending linearly without crossing to each other are alternately arranged in the circumferential direction, in which the first type of the sipes have an angle of 75-90° with respect to the circumferential direction and the second type of the sipes have an angle of 30-60°, whereby the sub-blocks having a triangular, trapezoidal or pentagonal form are defined in the each tapered land portion, so that it can be effectively suppressed to cause the largely fall-down deformation of the sub-block in a particular direction with respect to inputs from various directions to the sub-block, and hence the occurrence of uneven wear in the sub-block and the tapered land portion can be largely decreased as compared with the conventional technique of rendering the sub-block into the rectangular form.

Furthermore, the extending angle in the first type of the sipes is 75-90°, so that the edges of these sipes can contribute to effectively improve the traction and braking performances on snow in addition to the cutting of the water film on the wet road surface.

The tapered land portion itself is liable to be easily deformed in the widthwise direction to easily cause the uneven wear. However, the extending angle of the second type of the sipes is made within a range of 30-60° and the form of the sub-block defined by the two types of the spies and the groove is approximated to the triangular form, whereby the deforming direction of the sub-block can be dispersed to effectively suppress the uneven wear.

When one or more slant sub-grooves extending in a direction opposite to the curvedly slant groove are arranged in the each tapered land portion, shearing force of snow column can be generated by the slant sub-groove to enhance the performances on snow.

Also, the extending angle of the slant sub-groove is made within a range of 30-60°, whereby the occurrence of extremely acute angle corner part in the tapered land portion can be prevented to effectively remove the fears such as deterioration of steering stability, occurrence of uneven wear and the like due to the lowering of the rigidity in such a portion.

Furthermore, the wet drainage performance can be more improved under an action of a circumferentially zigzag groove actualized by the slant sub-grooves and the curvedly slant grooves. Moreover, it is preferable that the above slant sub-groove has a groove center line within a range of 35-75% of the treading face width from the treading face end, or the groove center is existent in the vicinity of the central part of the land portion defined between the circumferential groove and the aforementioned third circumferential groove. In this case, the high drainage property and performances on snow can be developed by the slant sub-grooves.

When the slant sub-groove is extended substantially in parallel to the second type of the sipes within a limit of an angle difference of ±15°, the sub-block defined by the slant sub-groove, sipes and other grooves can be sufficiently approximated to the triangular form as previously mentioned to thereby effectively suppress the occurrence of uneven wear.

In another tire according to the invention, while the features of the aforementioned tire are maintained, while the second circumferential groove is arranged in the second half part of the treading face within a range of 10-25% of the treading face width from the treading face end, and the third circumferential groove is arranged inward therefrom in the widthwise direction of the treading face, and the width of the land row defined between the third circumferential groove and the circumferential groove extending in the first half part of the treading face at a position corresponding to 10-30% of the treading face width from the treading face end is made not less than 1.5 times the width of the land row defined between the second and third circumferential grooves, and the tread patterns are made asymmetry with respect to the center of the treading face, whereby the drainage property can be more enhanced under the action of at least three circumferential grooves to ensure the excellent resistance to hydroplaning. Also, the width of the land row inclusive of the tapered land portions located outside the vehicle in the mounting onto the vehicle is made not less than 1.5 times, whereby the rigidity of the land row in the widthwise direction of the treading face can be increased to largely improve the turning performance.

Also, the tread pattern of the treading face is made asymmetry with respect to the center of the treading face, whereby a portion of the treading face located inside the vehicle and a portion of the treading face located outside the vehicle at a posture of mounting on the vehicle are functionally separated, if necessary. For example, the drainage function can be mainly developed by the portion located inside the vehicle, and the gripping function on road surface can be mainly developed by the portion located outside the vehicle.

In such a tire, when the slant groove inclining in the same direction as in the curvedly slant groove and opening to the second and third circumferential grooves is arranged between these grooves, the ground contacting property of the land row defined between these grooves is enhanced, but also the smooth and rapid drainage function toward the treading face end can be developed.

In this case, when the slant groove is opened to the second circumferential groove through a region reducing the cross sectional area in the vicinity of the second circumferential groove, the pattern noise can be advantageously reduced by the region decreasing the cross sectional area while ensuring the drainage performance and performances on snow.

In this tire, when the sub-grooves each protruding from one circumferential groove toward the treading face end and terminating in the land portion are arranged side the first half part of the treading face, the improvement of the performances on snow can be attained. Also, the termination of the sub-groove in the land portion can suppress the increase of the pattern noise but also the occurrence of the uneven wear.

When the sub-groove is formed on an extension of the curvedly slant groove, the shearing force of snow column can be enhanced to improve the performances on snow as compared with the case not forming on the extension.

Furthermore, similar results are obtained when the another sub-groove protruding from the second circumferential groove toward the treading face end and terminating in the land portion is formed on an extension of the slant groove.

In the other tire according to the invention, the same tread pattern as in the first-mentioned tire is formed in the first half part of the treading face, while the land row forming a line-symmetry with the above tread pattern is formed through the center circumferential groove in the second half part of the treading face, whereby the curvedly slant grooves extending in both sides of the center circumferential groove can be extended in a direction along the drainage flow line during the running of the tire under loading to more improve the drainage performance.

In a further tire, the same tread pattern as in the first-mentioned tire is formed in the first half part of the treading face, while the land row forming a point-symmetry with the above tread pattern is formed through the center circumferential groove in the second half part of the treading face, whereby the directionality in the rotating direction of the tire can be dropped out to conduct the rotation between left and right wheeled tires, and hence the occurrence of uneven wear can be advantageously suppressed.

In these latter two tires, when the land row near to the treading face end or adjacent thereto is a rib, the rigidity of the land row can be sufficiently enhanced to improve the turning performance.

When the circumferential sipe is formed in the widthwise middle portion of the rib, the edge component in the circumferential direction can be increased to improve the turning performance on snow.

Further, when the lateral sipes are formed between the circumferential sipe and the circumferential groove and between the circumferential sipe and the treading face end and the pitch of the lateral sipes formed side the circumferential groove is made larger than that of the lateral sipes formed at the opposite side, the excellent turning performance can be developed while ensuring the required rigidity of the land portion.

When the sub-groove is arranged between the lateral sipes formed between the circumferential sipe and the circumferential groove and the lateral groove is arranged between the circumferential sipe and the treading face end at a position corresponding to the forming pitch of the lateral sipe, the shearing force of snow column can be enhanced to more improve the performances on snow.

BRIEF DESCRIPTION OF THE DRAWINGS

The invention will be described with reference to the accompanying drawings, wherein.

DESCRIPTION OF THE PREFERRED EMBODIMENTS

Figure 1:
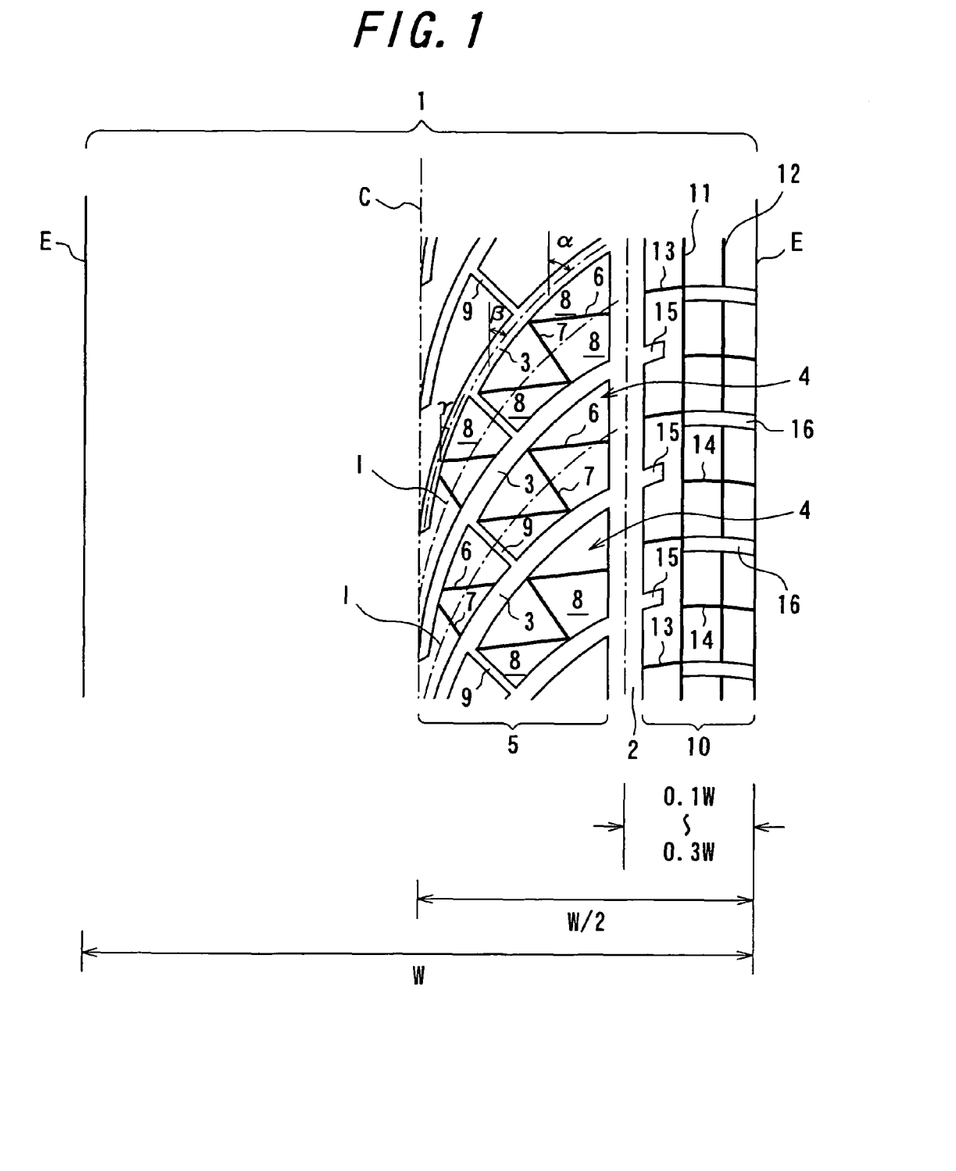
FIG. 1 is a developed view of a tread pattern in only a half part of a treading face according to a first embodiment of the invention.

FIG. 1 is a developed view of a tread pattern in only a half part of a treading face in a tire according to a first embodiment of the invention. Moreover, a proper tread pattern can be formed in the remaining half part of the treading face, if necessary.

The internal structure of the tire not shown may be typically the same as in a radial tire for a passenger car, a radial tire for a small-size truck or the like.

In a first half part of a treading face 1 shown in FIG. 1, one circumferential groove 2 extending linearly and continuously in a circumferential direction is arranged within a range of 10-30% of a treading face width W from an end E of the treading face, and a plurality of curvedly slant grooves 3 extending from the circumferential groove 2 toward a side of a central part of the treading face or toward a side of a center C of the treading face, in which angles α, β, γ at an acute angle side with respect to the circumferential direction are gradually made small away from the circumferential groove 2 and a convex form is taken upward in the figure, are formed at given intervals in the circumferential direction to define a tapered land portion 4 having a width gradually decreased toward the center C of the treading face between the circumferentially adjoining curvedly slant grooves 3, whereby a central land row 5 consisting of the tapered land portions 4 is formed between the center C of the treading face and the circumferential groove 2.

Moreover, the "width" of the tapered land portion 4 used herein means a width measured in a direction perpendicular to a centerline 1 of the land portion passing through a circumferentially middle point of the land portion 4 extending in the extending direction of the land portion 4.

In the each tapered land portion 4 of the land row 5 are alternately arranged two types of sipes 6, 7 linearly extending at large and small inclination angles at an acute angle side with respect to the circumferential direction without crossing to each other and opening at their ends to the grooves 2, 3, in which a first type of the sipes 6 has an angle at the acute angle side with respect to the circumferential direction of 75-90° and a second type of the sipes 7 has an angle at the acute angle side of 30-60°.

Figure 2:
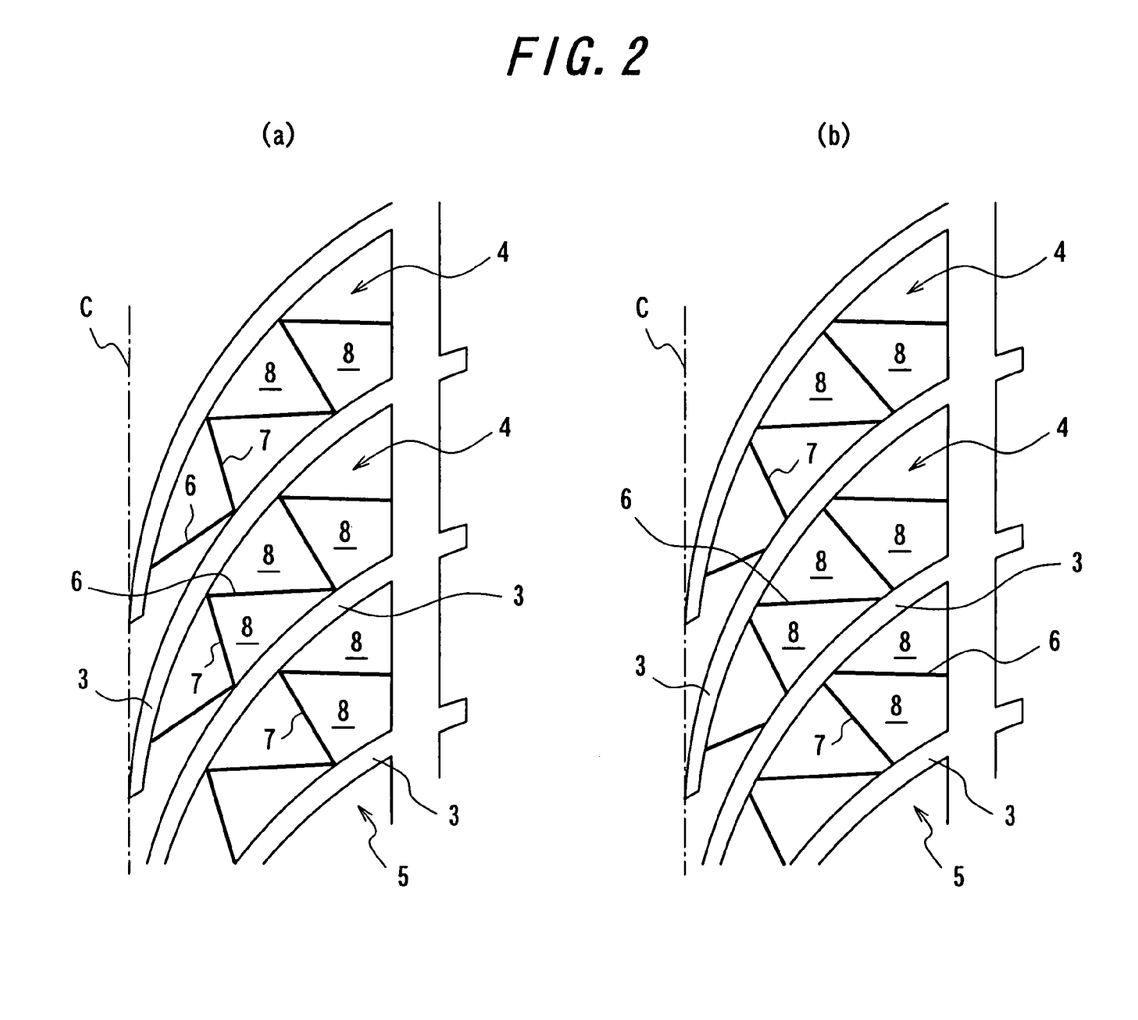
FIG. 2 is an enlarged view of a main part illustrating another forming form of a sipe.

As shown in FIG. 2(a), the sipes 6, 7 extending without crossing to each other are terminated at intersects on edges of the tapered land portion 4, respectively, whereby sub-blocks 8 having triangular and trapezoidal forms are defined in the tapered land portion 4 together with the grooves 2 and 3. As shown in FIG. 2(b), the sipes 6, 7 are extended in the land portion 4 without intersecting to each other, whereby the sub-blocks 8 having triangular, trapezoidal and pentagonal forms can be defined in the land portion 4. As shown in FIG. 1, there can be properly selected the sipes 6, 7 terminated at the intersects on the edges of the land portion 4 and the sipes 6, 7 extending without intersecting to each other. Particularly, when selecting the latter two extending forms of the sipes, the surface areas of the sub-blocks 8 defined by the sipes 6, 7 can be easily uniformized, so that it can be advantageously prevented that only the particular sub-blocks are prematurely worn.

In the embodiment of FIG. 1, one or more slant sub-grooves, one slant sub-groove 9 in the figure is arranged in each of the tapered land portions 4 so as to linearly extend in a direction opposite to the curvedly slant groove 3 at an angle at the acute angle side with respect to the circumferential direction of 30-60° and open to the adjoining curvedly slant grooves 3. For example, the groove center of the slant sub-groove 9 is positioned within a range of 40-70% of the width of the land row 5 measured from the circumferential groove 2. Preferably, the slant sub-grooves 9 are arranged at intervals in the circumferential direction at a posture of being substantially in parallel to the sipe 7, whereby they are extended zigzag through the curvedly slant grooves 3.

Furthermore, a side land row 10 defined between the circumferential groove 2 and the treading face end E is a rib, and two circumferential sipes 11, 12 extending linearly and continuously in the circumferential direction are formed at positions dividing the rib into three equal parts, and lateral sipes 13, 14 are arranged between the circumferential groove 2 and the circumferential sipe 11 located near thereto and between the circumferential sipe 11 and the treading face end E, respectively, so as to extend substantially in the widthwise direction of the treading face and open to the groove, sipe and treading face end in such a manner that the lateral sipes 13, 14 formed at the same equal pitch are shifted by a half pitch to each other in the circumferential direction.

In addition, a sub-groove 15 protruding from the circumferential groove 2 toward the treading face end and terminating without arriving at the circumferential sipe 11 is arranged between the lateral sipes 13 formed side the circumferential groove 2, for example, at substantially a middle position between the adjoining two lateral sipes 13, preferably on an extension of the curvedly slant groove 3, while a lateral groove 16 opening to the circumferential sipe 11 and the treading face end E is arranged at substantially a middle position between the adjoining lateral sipes 14 formed side the treading face end, preferably in parallel to the lateral sipe 14.

According to the tire having the above construction, the excellent wet performances, performances on snow and steering stability can be sufficiently ensured and further the uneven wear of the sub-blocks 8 defined by the sipes 6, 7 can be effectively prevented by the tread pattern of the central land row 5 as previously mentioned.

Also, high performances on snow in front-back and lateral directions, i.e. traction, braking and turning performances and excellent steering stability can be ensured by the tread pattern of the side land row 10.

FIG. 3(a) is a developed view of a tread pattern in a tire according to a second embodiment of the invention using the whole of the above construction as a main part. In this case, the same tread pattern as mentioned above is formed in the first half part of the treading face 1, while a second circumferential groove 17 extending linearly and continuously in the circumferential direction is arranged in a second half part of the treading face 1 at a position corresponding to 10-25% of the treading face width W from the treading face end E and also a third circumferential groove 18 extending linearly and continuously in the circumferential direction is arranged at a position separated from the second circumferential groove 17 toward the center C of the treading face by not less than 15% of the treading face width W, and a width W2 of a land row 20 defined between the third circumferential groove 18 and the one circumferential groove 2 located in the first half part of the treading face, which is somewhat wider than the land row 5, is made not less than 1.5 times a width W1 of a land row 19 defined between the circumferential grooves 17 and 18, whereby a tread pattern as a whole of the treading face is asymmetry with respect to the center C of the treading face.

In this case, a plurality of slant grooves 21 inclining in the same direction as in the curvedly slant grooves 3 but curving somewhat convex downward in the figure and opening to the circumferential grooves 17, 18 are formed between the second circumferential groove 17 and the third circumferential groove 18 at intervals in the circumferential direction to render the land row 19 into a block row. Also, a portion of the slant groove 21 in the vicinity of the second circumferential groove 17, for example, a portion extending within a range of 20-50% of the width W1 of the land row measured from the circumferential groove 17 is a region 21a decreasing a cross-sectional area as seen from FIG. 3(b) showing a section taken along a line b-b of FIG. 3(a).

In the illustrated region 21a, the groove width of the slant groove 21 having a width of 4 mm and a depth of 7 mm is decreased to 0.7 mm through an inclination face 21b having a depth of 1.5 mm measured from the outer surface by casting forth from one groove edge. By forming such a region, the pattern noise can be reduced and the resistance to uneven wear can be improved. Moreover, the reason why the land row 19 is an entire rib is due to the fact that the performances on snow are improved by the action of edge components in the land row.

Further, one slant sipe 22 passing through substantially a middle position between the adjoining slant grooves 21 and extending in parallel thereto and one cross sipe 23 crossing with the slant sipe 22 and extending in a direction perpendicular thereto are arranged in each block of the land row 19 so as to pass through the block, respectively. As a result, the edge components of the slant sipes 22 guarantee the traction and braking performances on snow, while the cross sipes 23 guarantee the improvement of the turning performance on snow.

In this second tire, a side land row 24 defined between the second circumferential groove 17 and the treading face end E is a rib, and one circumferential sipe 25 extending linearly and continuously in the circumferential direction is arranged at a middle position in the widthwise direction of the rib, while lateral sipes 26, 27 having a curved form of somewhat downward convex and extending in the widthwise direction of the treading face are formed between the circumferential sipe 25 and the second circumferential groove 17 and between the circumferential sipe 25 and the treading face end E so as to open to the sipe, groove and end, respectively, in such a manner that the forming pitch of the lateral sipes 26 is made larger than the forming pitch of the lateral sipes 27. Also, a sub-groove 28 extending in parallel to the lateral sipe 26 and opening to the circumferential groove 17 and the circumferential sipe 25 is arranged at substantially a middle position between the adjoining lateral sipes 26, and a lateral groove 29 extending from the treading face end E along the lateral sipe 27 and terminating without arriving at the circumferential sipe 25 is arranged at substantially middle position of a large pitch portion among the lateral sipes 27 having two large and small forming pitches.

According to such a tread pattern of the side land row 24, the shearing force of snow column can be increased by the edge components of the sipes 26, 27 and the sub-grooves 28 to effectively improve the traction and braking performances on snow, and also the turning performance on snow can be effectively improved by the circumferential sipe 25.

In addition, as shown in FIG. 3(a), a plurality of linear sipes 30 inclining in the same direction as in the slant sipe 22 and opening to the circumferential groove 18 and the curvedly slant groove 3 are formed in a portion of the land row 20 near to the third circumferential groove 18 at a pitch approximately equal to the forming pitches of the slant groove 21 and the slant sipe 22 and in parallel to each other.

The edge components of these linear sipes 30 can act to improve the traction and braking performances on snow.

Figure 4:
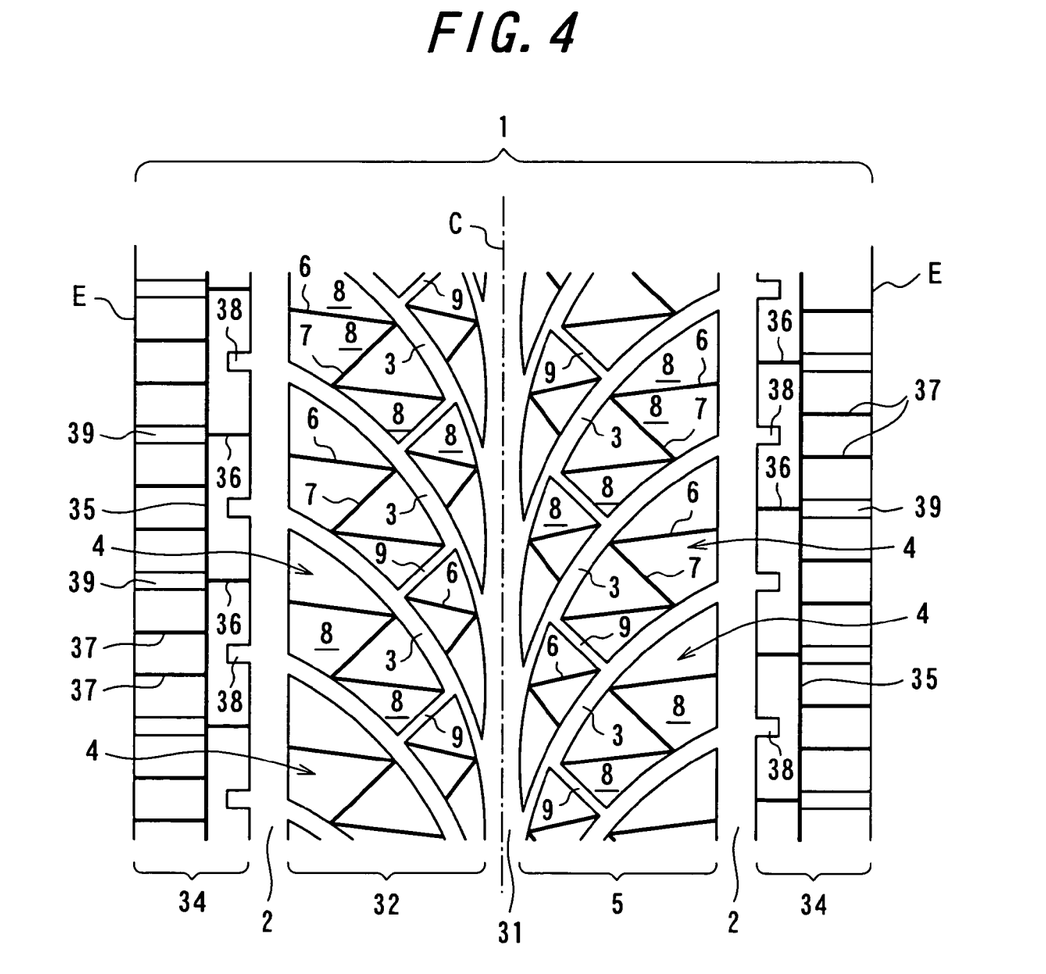
FIG. 4 is a developed view of a tread pattern in a tire according to a third embodiment of the invention.

FIG. 4 is a developed view of a tread pattern in a tire according to a third embodiment of the invention. In this case, the tread pattern of the land row 5 previously mentioned in relation to FIG. 1 is formed in the first half part of the treading face 1, while a land row 32 having a line-symmetry with the above tread pattern is formed in the second half part of the treading face 1 through a center circumferential groove 31 formed on the center C of the treading face and continuously extending in the circumferential direction. In a tire of FIG. 5 showing a developed view of a fourth embodiment of the invention, a land row 33 having a point-symmetry with the tread pattern of the land row 5 formed in the first half part of the treading face 1 is formed in the second half part of the treading face through the same center circumferential groove 31 as mentioned above.

Figure 5:
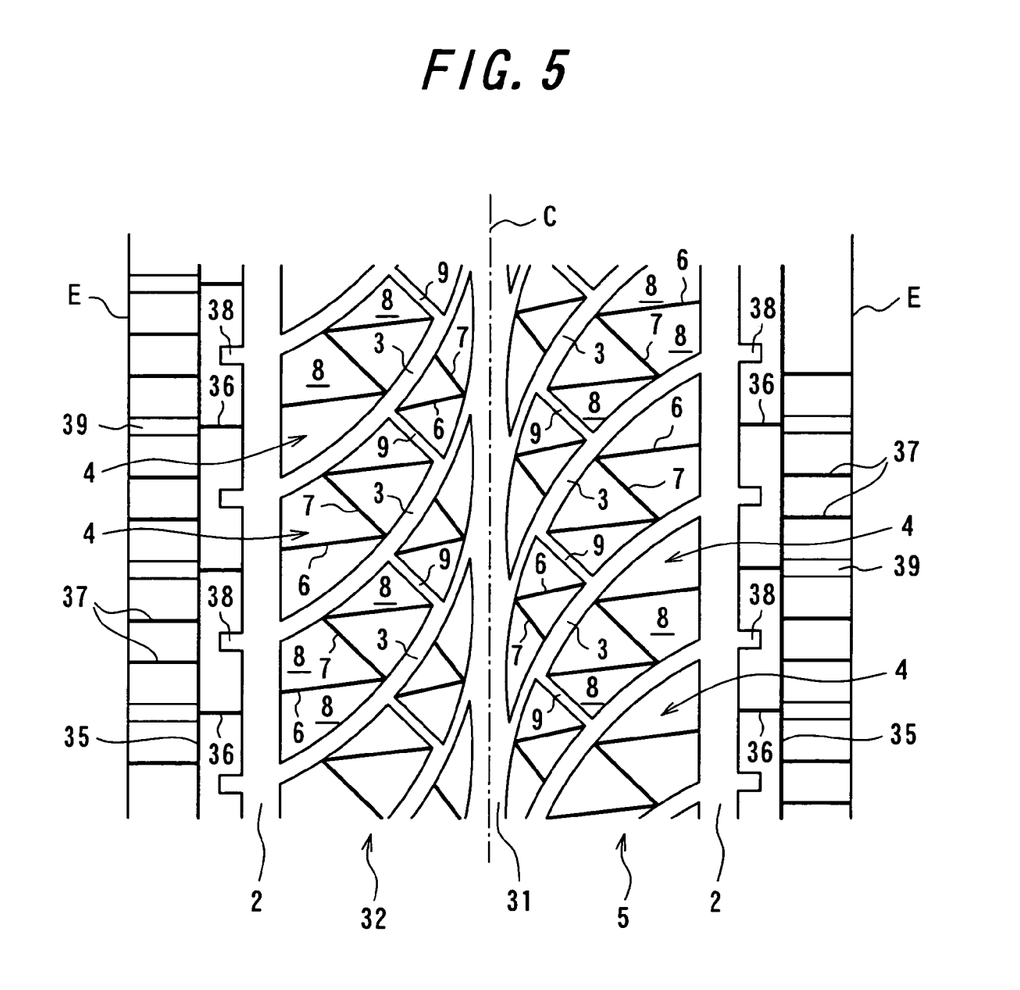
FIG. 5 is a developed view of a tread pattern in a tire according to a fourth embodiment of the invention.

In these tires shown in FIGS. 4 and 5, it is preferable that a side land row 34 defined between the treading face end E and the circumferential groove 2 nearest thereto in the widthwise direction is a rib and one circumferential sipe extending linearly and continuously in the circumferential direction is formed in a widthwise middle portion of the rib and lateral sipes 36, 37 are arranged between the circumferential sipe 35 and the circumferential groove 2 and between the circumferential sipe 35 and the treading face end W so as to extend in the widthwise direction of the treading face and open to the sipe, groove and end, respectively, in such a manner that the forming pitch of the lateral sipes 36 located side the circumferential groove 2 is made larger than the forming pitch of the lateral sipes 37 located side the treading face end. Also, a sub-groove 38 opening to the circumferential groove 2 but terminating without arriving at the circumferential sipe 35 is arranged at substantially a middle position between the adjoining lateral sipes 36, while a lateral groove 39 opening to the treading face end and the circumferential sipe 35 is arranged between the lateral sipes 37 at a position corresponding to the forming pitch of the lateral sipe 37 and every two lateral sipes 37 in the figure.

Figure 3:
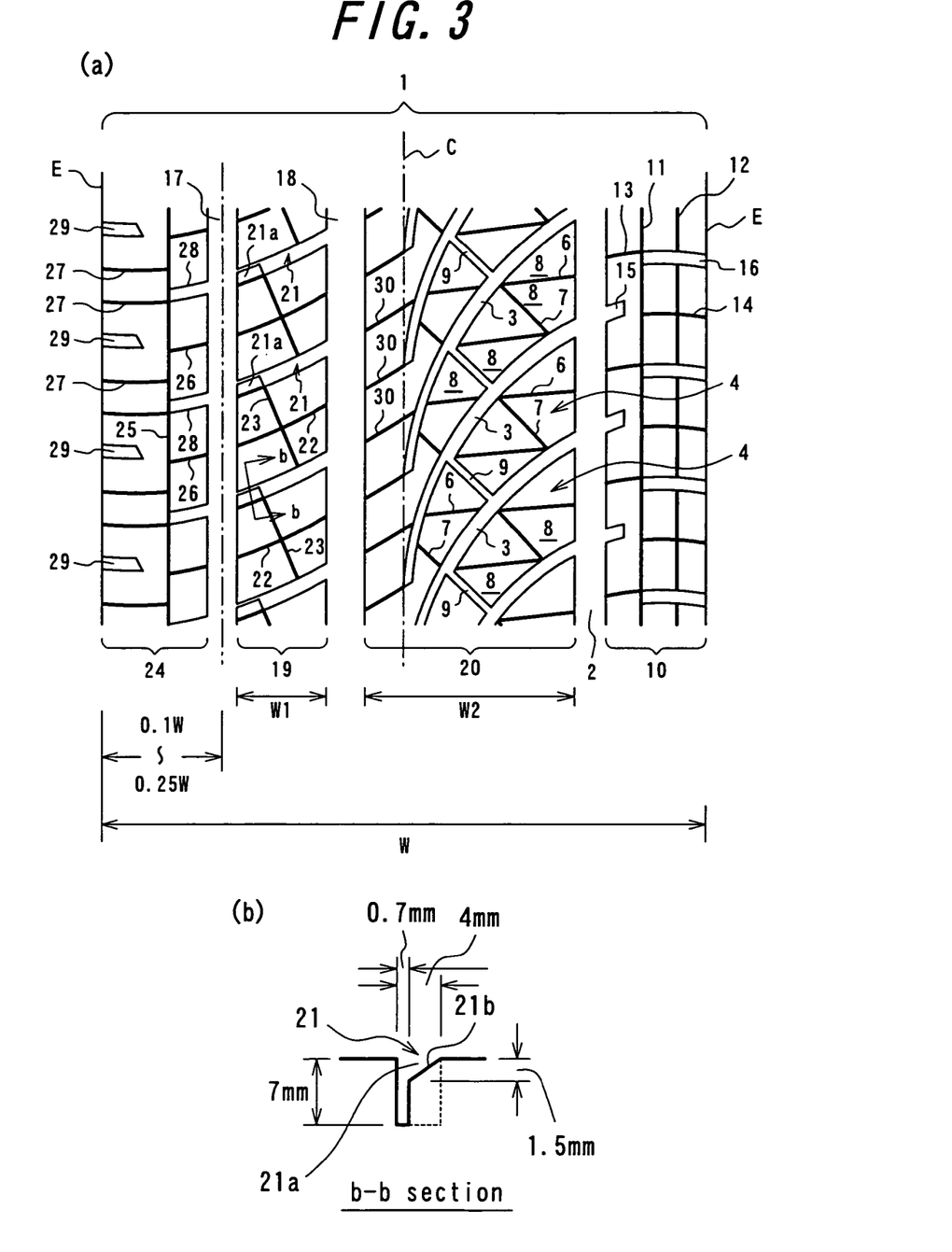
FIG. 3 is a developed view of a tread pattern in a tire according to a second embodiment of the invention.

According to the tires having the above tread pattern of the side land row 34, there can be attained the same function and effects as described in the side land row 24 of FIG. 3(*a*).

The following examples are given in illustration of the invention and are not intended as limitations thereof.

There are provided example tires and conventional tire for passenger cars having a common internal reinforcing structure and a tire size of 205/55R16 by varying a tread pattern as shown in FIGS. 3-6 and selecting a groove size and the like as shown in Tables 1-4. With respect to these tires, tests for resistance to hydroplaning, steering stability on dry road surface and performances on snow are carried out to obtain results represented by an index as shown in Table 5. Moreover, the larger the index value in Table 5, the better the result.

Under the test conditions that the tire inflated under an internal pressure of 220 kPa is mounted onto a vehicle and a load corresponding to two crewmen is applied, the resistance to hydroplaning is evaluated by feeling of a test driver on a speed in the occurrence of hydroplaning when the vehicle is run on a wet road surface having a water depth of 5 mm, and the steering stability on a dry road surface is evaluated by feeling of a test driver when the vehicle is run on a circuit course of a dry state under various sport running modes, and the feeling on snow is totally evaluated from the braking, start moving, straight running and cornering on a test course of compacted snow road surface, and the braking on snow is evaluated by measuring a braking distance in the full braking from 40 km/h on a compacted snow road, and the traction on snow is evaluated by measuring an acceleration time over a distance of 50 m in the start moving on a compacted snow road.

TABLE 1

Example tire 1 (FIG. 3)
Width W of treading face: 166 mm

| Name | Width (mm) | Groove depth (mm) |
|---|---|---|
| Circumferential groove 2 | 9 | 9.3 |
| Third circumferential groove 18 | 10 | 9.3 |
| Second circumferential groove 17 | 7.5 | 9.3 |
| Curvedly slant groove 3 | 2.5-4 | 6.5-8 |
| Slant groove 21 | 4 | 6.5-8 |
| Lateral groove 16 | 3.5 | 8 |
| Lateral groove 29 | 3.5 | 8 |
| Sub-groove 15 | 4 | 5 |
| Sub-groove 28 | 3 | 5 |
| Slant sub-groove 9 | 2 | 5 |
| Sipes 6, 7 | 0.7 | 6.5 (1.5 at end portion) |
| Slant sipe 22 | 0.7 | 6.5 (1.5 at end portion) |
| Lateral sipe 14 | 0.7 | 6.5 |
| Lateral sipe 27 | 0.7 | 6.5 |
| Circumferential sipe | 0.7 | 2 |
| Other sipes | 0.7 | 5 |

TABLE 2

Example tire 2 (FIG. 4)
Width W of treading face: 166 mm

| Name | Width (mm) | Groove depth (mm) |
|---|---|---|
| Circumferential groove 2 | 9 | 9.3 |
| Center circumferential groove 31 | 8.5 | 9.3 |
| Curvedly slant groove 3 | 2.5-4 | 6.5-8 |
| Lateral groove 39 | 3.5 | 8 |
| Sub-groove 38 | 4 | 5 |
| Slant sub-groove 9 | 2 | 5 |
| Sipes 6, 7 | 0.7 | 6.5 (1.5 at end portion) |
| Lateral sipe 37 | 0.7 | 6.5 |
| Circumferential sipe 35 | 0.7 | 2 |
| Other sipes | 0.7 | 5 |

TABLE 3

Example tire 3 (FIG. 5)
Width W of treading face: 166 mm

| Name | Width (mm) | Groove depth (mm) |
|---|---|---|
| Circumferential groove 2 | 9 | 9.3 |
| Center circumferential groove 31 | 8.5 | 9.3 |
| Curvedly slant groove 3 | 2.5-4 | 6.5-8 |
| Lateral groove 39 | 3.5 | 8 |
| Sub-groove 38 | 4 | 5 |
| Slant sub-groove 9 | 2 | 5 |
| Sipes 6, 7 | 0.7 | 6.5 (1.5 at end portion) |
| Lateral sipe 37 | 0.7 | 6.5 |
| Circumferential sipe 35 | 0.7 | 2 |
| Other sipes | 0.7 | 5 |

TABLE 4

Conventional tire (FIG. 6)
Width W of treading face: 166 mm

| Name | Width (mm) | Groove depth (mm) |
|---|---|---|
| Circumferential groove 43 | 4-6 | 9.3 |
| Main groove 42 | 8 | 9.3 |
| Curvedly slant groove 45 | 5-7 | 8-6.5 |

TABLE 4-continued

Conventional tire (FIG. 6)
Width W of treading face: 166 mm

| Name | Width (mm) | Groove depth (mm) |
|---|---|---|
| Lateral groove 48 | 4 | 8 |
| Sub-groove 49 | 4 | 5 |
| Sipes 50, 51 | 0.7 | 6.5 (1.5 at end portion) |
| Slant sipe 56 | 0.7 | 5 |
| Sipe 53 | 0.7 | 6.5 |

TABLE 5

| | Conventional tire | Example tire 1 | Example tire 2 | Example tire 3 |
|---|---|---|---|---|
| Resistance to hydroplaning (straight) | 100 | 102 | 105 | 102 |
| Dry steering stability | 100 | 105 | 102 | 102 |
| Feeling on snow | 100 | 110 | 105 | 105 |
| Braking on snow | 100 | 110 | 105 | 105 |
| Traction on snow | 100 | 110 | 102 | 105 |

As seen from Table 5, all example tires show excellent results on all performances as compared with the conventional tire. Particularly, Example tire 1 can relatively develop the excellent performances.

What is claimed is:

1. A pneumatic tire comprising:
a tread pattern wherein at least one circumferential groove continuously extending in a circumferential direction is formed in at least a first half part of a treading face within a range of 10-30% of a width of the treading face from an end of the treading face and a plurality of curvedly slant grooves arranged at intervals in the circumferential direction and each extending from the at least one circumferential groove toward a side of a central part of the treading face so as to make an angle at an acute angle side with respect to the circumferential direction that gradually becomes smaller away from the circumferential groove,
wherein, a land row consisting of tapered land portions is defined between the circumferentially adjoining curvedly slant grooves and having a width that gradually decreases toward the side of the central part of the treading face, and sipes that linearly extend at two large and small inclination angles with respect to the circumferential direction without crossing with each other are alternately arranged in the circumferential direction, a first type of the sipes has an angle at the acute angle side with respect to the circumferential direction of 75-90° and a second type of the sipes has an angle at the acute angle side of 30-60°,
wherein a first end of each of the first type of sipes opens to one of the curvedly slant grooves and a second end of each of the first type of sipe opens to the at least one circumferential groove or an adjoining curvedly slant groove,
wherein a first end of each of the second type of sipes opens to one of the curvedly slant grooves and a second end of each of the second type of sipes opens to an adjoining curvedly slant groove, and wherein a first end of one of the first type of sipes connects with a first end of one of the second type of sipes at a point where the one first type of sipe and the one second type of sipe open to one of the curvedly slant grooves.

2. A pneumatic tire comprising:
a tread pattern wherein at least one circumferential groove continuously extending in a circumferential direction is formed in at least a first half part of a treading face within a range of 10-30% of a width of the treading face from an end of the treading face and a plurality of curvedly slant grooves arranged at intervals in the circumferential direction and each extending from the at least one circumferential groove toward a side of a central part of the treading face so as to make an angle at an acute angle side with respect to the circumferential direction that gradually becomes smaller away from the circumferential groove,
wherein, a land row consisting of tapered land portions is defined between the circumferentially adjoining curvedly slant grooves and having a width that gradually decreases toward the side of the central part of the treading face, and sipes that linearly extend at two large and small inclination angles with respect to the circumferential direction without crossing with each other are alternately arranged in the circumferential direction, a first type of the sipes has an angle at the acute angle side with respect to the circumferential direction of 75-90° and a second type of the sipes has an angle at the acute angle side of 30-60°,
wherein a first end of each of the first type of sipes opens to one of the curvedly slant grooves and a second end of each of the first type of sipes opens to the at least one circumferential groove or an adjoining curvedly slant groove,
wherein a first end of each of the second type of sipes opens to one of the curvedly slant grooves and a second end of each of the second type of sipes opens to an adjoining curvedly slant groove, and
the pneumatic tire further comprising a second circumferential groove linearly extending in the circumferential direction at a position corresponding to 10-25% of the treading face width from a tread end of a second half part of the treading face and a third circumferential groove separated inward from the second circumferential groove in the widthwise direction and linearly extending in the circumferential direction, and a width of a land row defined between the third circumferential groove and one main groove extending in the first half part of the treading face is made not less than 1.5 times a width of a land row defined between the second circumferential groove and the third circumferential groove.

3. A pneumatic tire according to claim 2, wherein a plurality of slant grooves inclining in the same direction as in the curvedly slant groove and opening to the second and third circumferential grooves are arranged between these circumferential grooves at intervals in the circumferential direction.

4. A pneumatic tire according to claim 3, wherein the slant groove is opened to the second circumferential groove through a region reducing a cross-sectional area.

5. A pneumatic tire according to claim 3, wherein a sub-groove, formed as an extension of the slant groove, protrudes from the circumferential groove extended in the first half part of the treading face toward a side of the treading face end and terminates in a side land row formed at the treading face end.

6. A pneumatic tire according to claim 5, wherein another sub-groove, formed as an extension of the slant groove, protrudes from the second circumferential groove toward a side of the end of the treading face in the second half part of the treading face and terminates in a side land row formed at the treading face end.

7. A pneumatic tire comprising:
a tread pattern wherein at least one circumferential groove continuously extending in a circumferential direction is formed in at least a first half part of a treading face within a range of 10-30% of a width of the treading face from an end of the treading face and a plurality of curvedly slant grooves arranged at intervals in the circumferential direction and each extending from the at least one circumferential groove toward a side of a central part of the treading face so as to make an angle at an acute angle side with respect to the circumferential direction that gradually becomes smaller away from the circumferential groove,
wherein, a land row consisting of tapered land portions is defined between the circumferentially adjoining curvedly slant grooves and having a width that gradually decreases toward the side of the central part of the treading face, and sipes that linearly extend at two large and small inclination angles with respect to the circumferential direction without crossing with each other are alternately arranged in the circumferential direction, a first type of the sipes has an angle at the acute angle side with respect to the circumferential direction of 75-90° and a second type of the sipes has an angle at the acute angle side of 30-60°,
wherein a first end of each of the first type of sipes opens to one of the curvedly slant grooves and a second end of each of the first type of sipes opens to the at least one circumferential groove or an adjoining curvedly slant groove,
wherein a first end of each of the second type of sipes opens to one of the curvedly slant grooves and a second end of each of the second type of sipes opens to an adjoining curvedly slant groove, and
the pneumatic tire further comprising a land row in a second half part of the treading face showing a line-symmetry or point-symmetry with the tread pattern of the first half part of the treading face, the second half part of the treading face is formed through a center circumferential groove continuously extending at the central portion of the treading face in the circumferential direction,
wherein a land row formed outward, in the widthwise direction, from the circumferential groove and located nearest to the end of the treading face is a rib and one circumferential sipe extending linearly and continuously in the circumferential direction is formed in a widthwise middle portion of the rib, and first lateral sipes are formed between the circumferential sipe and the circumferential groove and second lateral sipes are formed between the circumferential sipe and the end of the treading face, respectively, so as to extend in the widthwise direction of the treading face and open to the one circumferential sipe, the circumferential groove and the treading face end in such a manner that a pitch of the first lateral sipes is made larger than a pitch of the second lateral sipes, and further a sub-groove is arranged between the first lateral sipes, the sub-groove terminating without connecting to the circumferential sipe and being open to the circumferential groove, and a lateral groove is provided, the lateral groove being open to the circumferential sipe and the treading face end, so as to be formed between the circumferential sipe and the treading face end every one or more of the second lateral sipes at a position corresponding to the forming pitch of the second lateral sipe.

* * * * *